3,664,747
SIGHT-TAKING PERISCOPE
David S. Ritchie, Anniesland, Glasgow, Scotland, assignor to Barr and Stroud Limited, Glasgow, Scotland
Filed Feb. 4, 1966, Ser. No. 525,804
Claims priority, application Great Britain, Feb. 13, 1965, 6,328/65
Int. Cl. G01b 1/14
U.S. Cl. 356—140
9 Claims

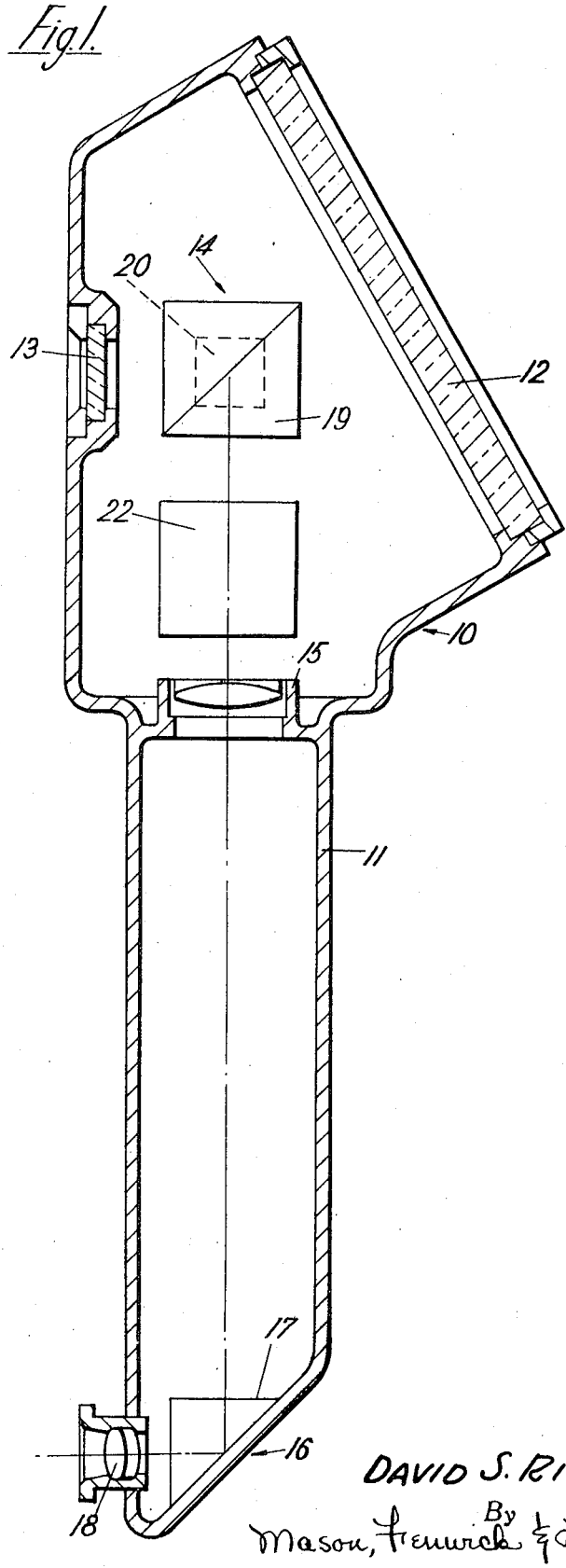

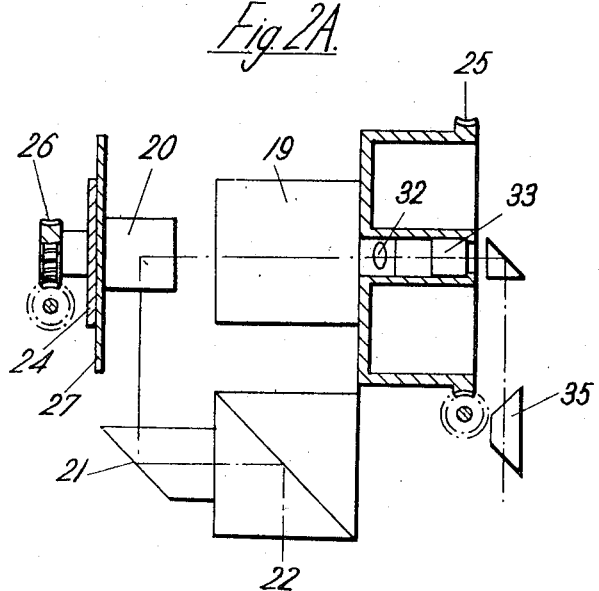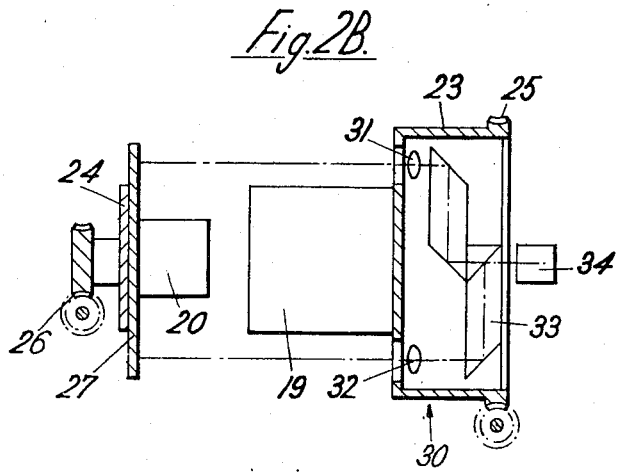

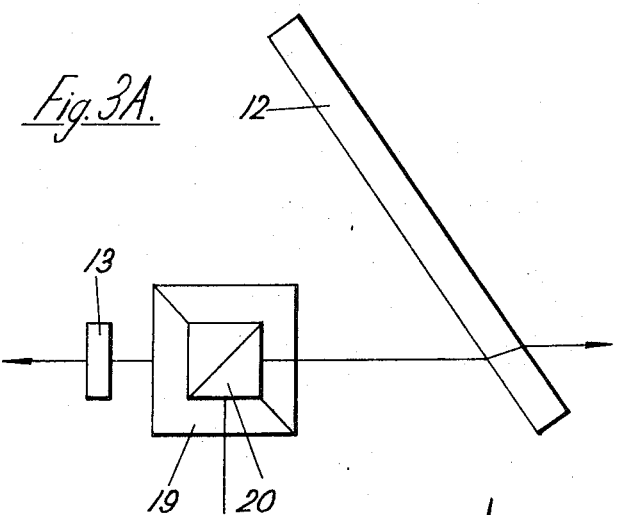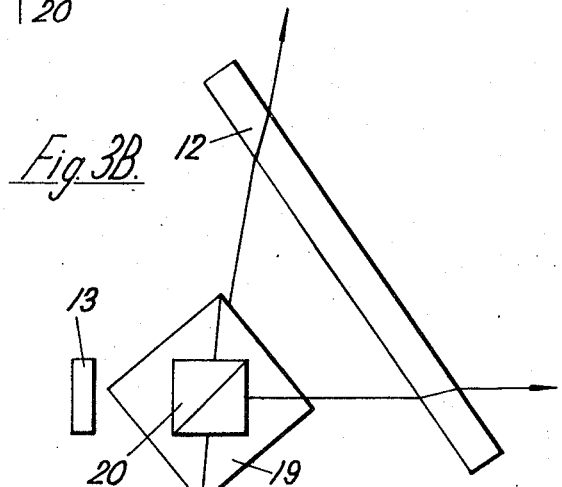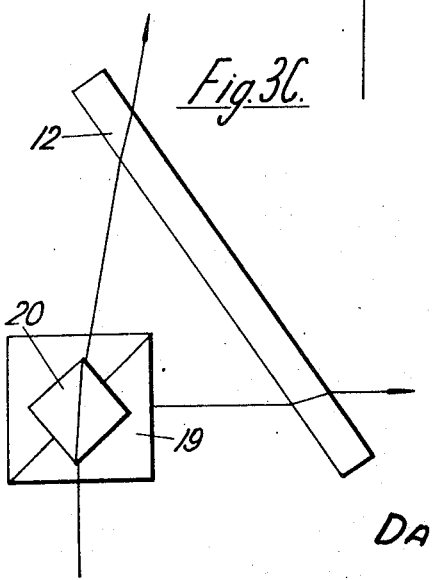

ABSTRACT OF THE DISCLOSURE

A sight-taking periscope which has a head including a viewing window and a pair of sight-taking prisms mounted on a common horizontal axis and independently rotatable thereabout, an angular scale of altitude rotatable with one of the prisms and a scale reading optical system rotatable with the other prism to permit measurement of the angle between the lines of sight of the prisms.

---

This invention relates to sight-taking periscopes.

Sextants and sight-taking periscopes using the natural horizon for the measurement of altitude are limited to use at twilight, when the horizon and stars can both be seen, or during the day on bright bodies such as the sun or moon. In the construction of these instruments, it is customary to elevate a mirror or reflector to view the heavenly body and to provide a fixed system to view the natural (or artificial) horizon. A beam-combining prism or reflector is required which must be so arranged as to compromise between the need for maximum light transmission from both the star and the horizon.

In the case of sight-taking periscopes, considerations of size at the viewing window end have tended to restrict the light gathering power which, coupled with the compromise nature of the beam-combining prism, have severely restricted the amount of light reaching the observer from the horizon at twilight and therefore his ability to see it clearly.

An object of the present invention is to provide a sight-taking periscope in which the accuracy of position fixing is increased, not only by increasing the accuracy of individual altitude measurements, but by increasing the scope for taking sights by extending the time during which they can be taken.

According to the present invention I provide a sight-taking periscope including a head having a viewing window therein, first and second elevating prisms mounted in the head to view through the window, means for independently rotating said prisms to view upwardly from the horizontal, an angular scale of altitude rotatable with one said prism, and a scale reading optical system having a head rotatable with the other said prism, whereby a measure of the angle between the lines of sight of the prisms is provided.

An embodiment of the present invention will now be described, by way of example, with reference to the accompanying diagrammatic drawings, in which:

FIG. 1 is a sectional side elevation of a sight-taking periscope according to the present invention;

FIGS. 2A and 2B are respectively front elevation and plan views of the prism system and scale reading system mounted in the head of the periscope of FIG. 1; and FIGS. 3A, 3B, and 3C illustrate the two sight-taking prisms of the prism system in different positions of use.

Referring now to the drawings, a sight-taking periscope is illustrated in FIG. 1 and consists of a head 10 mounted at the top of a tube or column 11 and provided with primary and secondary viewing windows 12 and 13 respectively, a prism system 14 for sight-taking located within the head 10, a projection lens system 15 and an eyepiece viewing system 16 consisting of a prism 17 and an eyepiece lens combination 18. FIG. 1 is, of course, diagrammatic and the periscope column 11 would normally be much longer than illustrated and would contain several stages in the projection lens system.

The prism system 14 consists of first and second sight-taking prisms 19 and 20 mounted on a common horizontal axis and independently rotatable about that axis. The prism 19 is of sufficient size to provide the maximum useful aperture (say 80 mm.) which the observer can accept taking into consideration the magnification of the viewing system (say ×20) and has sufficient light gathering power to enable first magnitude stars to be seen well into daylight and the horizon to be seen well into darkness. The second sight-taking prism 20, due to space limitations in the head of the periscope is considerably smaller and provides a pupil of, say, 25 mm., this however, being sufficient to enable stars to be seen at night and the horizon in daytime.

The role of the two prisms, in respect of object viewed, is thus changed as between daylight and darkness.

The beams from the two prisms 19 and 20 are combined by prisms 21 and 22 and then pass through the projection lens system 15 to the eyepiece lens combination 18. The beam combining prism 22 is arranged to give maximum transmission of light from the larger prism.

Referring to FIGS. 2A and 2B, the prisms 19 and 20 are rotated through their mountings 23 and 24 by worm/wormwheel drives 25 and 26 respectively. The worms are rotated by rods extending to the lower end of the periscope and operable by handles located conveniently for the observer.

On the mounting 24 of the prism 20 is provided a circular scale 27 which is read, in the conventional manner of accurate theodolites, at two diametrically opposed points. An optical system 30 is provided for viewing the scale 27, is rotatable with the mounting 23 of the prism 19, and consists of two objective lenses 31 and 32 which pass their beams through a beam combining prism combination 33 and thence through a fixed prism 34 and a dove prism 35 to the main periscope optical system or, alternatively to an auxilary optical system for viewing. The dove prism 35 is suitably geared to the rotational drive to the mounting 23 and serves to stabilise the scale image against rotation to facilitate reading.

In use the prisms 19 and 20 are sighted on the horizon and a star or other bright body, or vice versa and the scale reading is then an accurate measure of the elevation of the bright body. It should be noted that two images of opposite sides of the scale are combined in the periscope head and thus the accuracy of measurement is not lost by the projection of the combined image to the remote observer. Moreover the magnification of the optical viewing system provides greater accuracy in taking the sight and also assists in seeing the horizon clearly under twilight conditions.

The secondary viewing window 13 allows a source of measurement to be compensated. A source of inaccuracy in sight-taking on the natural horizon is that allowance has to be made for the dip of the horizon using the estimated height of the observing instrument. In the case of submarine periscopes, this figure is liable to variation and some uncertainty. Significant errors can also arise in the estimated allowance for refraction.

In the periscope according to the present invention the prism 19 is capable of rotation about its axis to the extent of viewing horizontally in the opposite direction to the prism 20 and through the secondary viewing window 13. Of course, either prism could equally well be used, the window 13 being located to suit. By this means the angle subtended at the instrument head, by diametrically opposite points on the horizon, can be measured, and the amount by which this angle exceeds 180° is a measure of the combined dip and refraction angle.

In FIG. 3A, the prism 20 views the horizon through the primary viewing window 12 and the prism 19 views the horizon through the secondary viewing window 20 for purposes of dip and refraction error compensation. In FIG. 3B, the arrangement is for daytime sights, the larger prism 19 being elevated for a star sight and the smaller prism 20 viewing the horizon, both prisms using the primary viewing window 12. In FIG. 3C, the prism elevations are reversed for a night sight, the primary viewing window 12 again being used.

I claim:

1. A sight-taking periscope including a head having a viewing window therein, first and second elevating prisms mounted in the head to view through the window, means for independently rotating said prisms to view upwardly from the horizontal, an angular scale of altitude rotatable with one said prism, and a scale reading optical system having a head rotatable with the other said prism, whereby a measure of the angle between the lines of sight of the prisms is provided.

2. A sight-taking periscope as claimed in claim 1, in which an optical viewing system is provided and one of said prisms is of such a size as to provide the maximum useable aperture in relation to the optical viewing system.

3. A sight-taking periscope as claimed in claim 1, in which the angular scale and the scale reading optical system are such as to enable readings to be taken across a diameter of the scale, the images of both sides of the scale being combined in the head of the optical system.

4. A sight-taking periscope as claimed in claim 3, in which the scale reading optical system includes a dove prism rotatable upon rotation of the other said prisms and serving to stabilise the combined scale images against rotation.

5. A sight-taking periscope as claimed in claim 1 in which a second viewing window is provided in the periscope head and one of said elevating prisms is capable of rotation to the extent of viewing horizontally in the opposite direction to the other prism through the second viewing window.

6. A sight-taking periscope comprising a head, a viewing window in the latter, first and second elevating prisms mounted in the head for viewing through said window, means for independently rotating said prisms about a common horizontal axis for viewing respectively a heavenly body and the horizon, an angular scale of altitude rotatable with one of said prisms and a scale reading optical system having a head rotatable with the other of said prisms for providing a measure of the angle between the lines of sight of the prisms.

7. A sight-taking periscope comprising a head, a viewing window in the latter, first and second elevating prisms mounted in the head for viewing through said window and rotatable about a common horizontal axis, means for independently rotating said prisms about said axis for viewing respectively a heavenly body and the horizon, an angular scale of altitude rotatable with one of said prisms about said axis and an optical system for reading said scale and having a head rotatable with the other of said prisms for providing a measure of the angle between the lines of sight of said prisms.

8. A sight-taking periscope comprising a head, a viewing window in the latter, first and second elevating prisms mounted in the head for viewing through said window and rotatable about a common horizontal axis, the first prism being relatively large and the second prism being relatively small, means for rotating said prisms about said axis independently one of the other for viewing respectively and alternatively a heavenly body and the horizon, an angular scale of altitude rotatable with one of said prisms about said axis and an optical system for reading said scale and having a head rotatable with the other of said prisms for providing a measure of the angle between the lines of sight of said prisms, whereby, in daylight, the relatively large prism may be used for viewing a first magnitude star and the relatively small prism for viewing the horizon, and, in darkness, the relatively large prism may be used for viewing the horizon and the relatively small prism for viewing a star.

9. In a sight-taking periscope having a head, a viewing window in the head, an elevating prism mounted in the head for viewing through said window and rotatable about a horizontal axis, and having means for rotating said prism about said axis for viewing between the horizon and a heavenly body, and having an altitude indicator; a second elevating prism mounted in said head for viewing through said window and rotatable about said axis, second means for rotating said second prism about said axis for viewing between the horizon and a heavenly body independently of the first-mentioned prism, an altitude indicator comprising an angular scale of altitude rotatable about said axis with one of said prisms, and an optical system for reading said scale and having a head rotatable with the other of said prisms for providing a measure of the angle between the lines of sight of said prisms when one prism is viewing the horizon and the other is viewing a heavenly body, one of said prisms being relatively large and the other of said prisms being relatively small, whereby, in daylight, the relatively large prism may be used for viewing a first magnitude star and the relatively small prism for viewing the horizon, and, in darkness, the relatively large prism may be used for viewing the horizon and the relatively small prism for viewing a star.

References Cited

UNITED STATES PATENTS

| | | | |
|---|---|---|---|
| 725,570 | 12/1902 | Lake | 88—2.7 |
| 2,579,903 | 12/1951 | Carbonara | 88—2.7 |
| 2,995,972 | 8/1961 | Baalson | 350—33 |
| 3,046,830 | 7/1962 | Pierce et al. | 88—2.7 |
| 3,207,025 | 9/1965 | MacDonald | 88—2.7 |

VERLIN R. PENDEGRASS, Primary Examiner